US008655656B2

(12) United States Patent
Ketabdar et al.

(10) Patent No.: US 8,655,656 B2
(45) Date of Patent: Feb. 18, 2014

(54) METHOD AND SYSTEM FOR ASSESSING INTELLIGIBILITY OF SPEECH REPRESENTED BY A SPEECH SIGNAL

(75) Inventors: Hamed Ketabdar, Berlin (DE); Juan-Pablo Ramirez, Berlin (DE)

(73) Assignee: Deutsche Telekom AG, Bonn (DE)

( * ) Notice: Subject to any disclaimer, the term of this patent is extended or adjusted under 35 U.S.C. 154(b) by 174 days.

(21) Appl. No.: 13/040,342

(22) Filed: Mar. 4, 2011

(65) Prior Publication Data

US 2011/0218803 A1 Sep. 8, 2011

(30) Foreign Application Priority Data

Mar. 4, 2010 (EP) .................................... 10155450

(51) Int. Cl.
*G10L 15/00* (2013.01)

(52) U.S. Cl.
USPC ........... 704/240; 704/226; 704/251; 704/236; 704/246; 704/229; 704/500

(58) Field of Classification Search
None
See application file for complete search history.

(56) References Cited

U.S. PATENT DOCUMENTS 5,911,130 A * 6/1999 Shimizu et al. ............... 704/500
6,055,498 A * 4/2000 Neumeyer et al. ............ 704/246
6,226,611 B1 * 5/2001 Neumeyer et al. ............ 704/246
6,233,550 B1 * 5/2001 Gersho et al. ................ 704/208
6,411,925 B1 * 6/2002 Keiller .......................... 704/200
6,446,038 B1 * 9/2002 Bayya et al. .................. 704/232
6,678,655 B2 * 1/2004 Hoory et al. .................. 704/223
6,725,190 B1 * 4/2004 Chazan et al. ................ 704/205
7,447,630 B2 * 11/2008 Liu et al. ....................... 704/228
7,636,659 B1 * 12/2009 Athineos et al. .............. 704/205
8,185,389 B2 * 5/2012 Yu et al. ........................ 704/233
8,341,412 B2 * 12/2012 Conwell ........................ 713/176
8,428,957 B2 * 4/2013 Garudadri et al. ............ 704/500
2002/0147587 A1 * 10/2002 Townshend et al. .......... 704/235
2008/0010064 A1 * 1/2008 Takeuchi et al. .............. 704/229
2008/0071539 A1 * 3/2008 Allen et al. ................... 704/251
2008/0192956 A1 * 8/2008 Kazama ....................... 381/94.3
2009/0316930 A1 * 12/2009 Horbach et al. ................ 381/99
2010/0036663 A1 * 2/2010 Rangarao et al. ............. 704/240

(Continued)

OTHER PUBLICATIONS

G. Williams and D. Ellis, Speech/music discrimination based on posterior probability features, 1999, Eurospeech.*

(Continued)

*Primary Examiner* — Pierre-Louis Desir
*Assistant Examiner* — Fariba Sirjani
(74) *Attorney, Agent, or Firm* — Leydig, Voit & Mayer, Ltd.

(57) ABSTRACT

A method for assessing intelligibility of speech represented by a speech signal includes providing a speech signal and performing a feature extraction on at least one frame of the speech signal so as to obtain a feature vector for each of the at least one frame of the speech signal. The feature vector is input to a statistical machine learning model so as to obtain an estimated posterior probability of phonemes in the at least one frame as an output including a vector of phoneme posterior probabilities of different phonemes for each of the at least one frame of the speech signal. An entropy estimation is performed on the vector of phoneme posterior probabilities of the at least one frame of the speech signal so as to evaluate intelligibility of the at least one frame of the speech signal. An intelligibility measure is output for the at least one frame of the speech signal.

5 Claims, 2 Drawing Sheets

(56) References Cited

U.S. PATENT DOCUMENTS

| | | | | |
|---|---|---|---|---|
| 2010/0217606 A1* | 8/2010 | Osada et al. | 704/500 |
| 2010/0226510 A1* | 9/2010 | Kikugawa | 381/107 |
| 2010/0280827 A1* | 11/2010 | Mukerjee et al. | 704/236 |
| 2010/0299148 A1* | 11/2010 | Krause et al. | 704/237 |
| 2011/0153321 A1* | 6/2011 | Allen et al. | 704/226 |
| 2012/0102066 A1* | 4/2012 | Eronen et al. | 707/769 |

OTHER PUBLICATIONS

G. Williams and S. Renals, Confidence measures derived from an acceptor hmm, 1998, Proceedings of International Conference on Spoken Language Processing, p. 831-834.*

G. Bernardis and H. Bourlard, Improving Posterior Based Confidence Measures in Hybrid HMM/ANN Speech Recognition Systems, 1998, Proceedings of International Conference on Spoken Language Processing, p. 775-778.*

T. Schaaf and T. Kemp, Confidence measures for spontaneous speech recognition, 1997, IEEE, vol. 2, p. 875-878.*

S .Karneback, Discrimination between speech and music based on a low frequency modulation feature, 2001, Proc. Eurospeech, p. 1-4.*

Methods for Calculation of the Speech Intelligibility Index (ANSI S3.5-1997), Acoustical Society of America, Apr. 6, 1997, pp. 1-35.

Cherry, Colin E, "Some Experiments on the Recognition of Speech, with One and with Two Ears", J. Acoust. Soc. Am. 25 (5), Sep. 1953, pp. 975-979.

Boothroyd, Arthur and Nittrouer, Susan, "Mathematical Treatment of Context Effects in Phenome and Word Recognition", J. Acoust. Soc. Am. 84 (1), Jul. 1988, pp. 101-114.

Durlach, N.I., "Equalization and Cancellation Theory of Binaural Masking Differences", J. Acoust. Soc. Am. 38 (8), Aug. 1963, pp. 1206-1218.

Rhebergen, Koenraad S. and Niek J. Versfeld, "A Speech Intelligibility Index-based approach to predict the speech reception threshold for sentences in fluctuating noise for normal-hearing listeners", J. Acoust. Soc. Am. 117 (4), Pt. 1, Apr. 2005, pp. 2181-2192.

Steeneken, H. J. M. and T. Houtgast, "A physical method for measuring speech-transmission quality", J. Acoust.Soc.A m. 67(1), Jan. 1980, pp. 318-326.

* cited by examiner

METHOD AND SYSTEM FOR ASSESSING INTELLIGIBILITY OF SPEECH REPRESENTED BY A SPEECH SIGNAL

CROSS-REFERENCE TO PRIOR APPLICATIONS

Priority is claimed to European Application No. EP 10 15 5450.9, filed Mar. 4, 2010, the entire disclosure of which is hereby incorporated by reference herein.

FIELD

The present invention relates to an approach for assessing intelligibility of speech based on estimating perception level of phonemes.

BACKGROUND

Speech intelligibility is the psychoacoustics metric that enhances the proportion of an uttered signal correctly understood by a given subject. Recognition tasks include phone, syllable, words, up to entire sentences. The ability of a listener to retrieve speech features is submitted to external features such as competing acoustic sources, their respective spatial distribution or presence of reverberant surfaces; as well as internal such as prior knowledge of the message, hearing loss, attention. The study of this paradigm, mentioned as the "cocktail party effect" by Cherry in 1953 has motivated numerous research.

Formerly known as the Articulation Index from French and Steinberg (1947), resulting from Fletcher's life long multiple discoveries and intuition, the Speech Intelligibility Index (SII ANSI-1997) aims at quantifying the amount of speech information available left after frequency filtering or masking of speech by stationary noise. It is correlated with intelligibility, and mapping functions to the latter are established for different recognition tasks and speech materials. Similarly Steeneken and Houtgast (1980) developed the Speech Transmission Index that predicts the impact of reverberation on intelligibility from the speech envelop. Durlach proposed in 1963 the Equalization and Cancellation theory that aims at modelling the advantage of monaural over binaural listening present when acoustic sources are spatially distributed. The variability of the experimental methods used inspired Boothroyd and Nittrouer who initiated in 1988 an approach to quantify the predictability of a message. They set the relation between the recognition probabilities of an element and the whole it composes.

However accurate these methods have proven to be, they apply to maskers with stationary properties. The very common case of the competing acoustic source being another source of speech cannot be enhanced by these methods as speech is non-stationary by definition. In the meanwhile, communication with multiple speakers is bound to increase, while non-stationary sources severely impair the listeners with hearing loss, the later emphasizing the cocktail party effect.

If one aims at predicting situations that are to vary, it is necessary to include the variable time in models, and consequently these should progressively become signal-based. In 2005, Rhebergen and Versfeld proposed a conclusive method for the case of time fluctuating noises. However, the question of speech in competition with speech remains. Voice similarity, utterance rate and cross semantics are some of the features that add to the variability in the attention as artifacts on the recognition performances by the listener.

Generative models such as Gaussian Mixture Models are known (see, e.g., McLachlan, G. J. and Basford, K. E. "Mixture Models: Interference and Applications to Clustering", Marcel Dekker (1988)).

SUMMARY

In an embodiment, the present invention provides a method for assessing intelligibility of speech represented by a speech signal. A speech signal is provided. A feature extraction is performed on at least one frame of the speech signal so as to obtain a feature vector for each of the at least one frame of the speech signal. The feature vector is input to a statistical machine learning model so as to obtain an estimated posterior probability of phonemes in the at least one frame as an output including a vector of phoneme posterior probabilities of different phonemes for each of the at least one frame of the speech signal. An entropy estimation is performed on the vector of phoneme posterior probabilities of the at least one frame of the speech signal so as to evaluate intelligibility of the at least one frame of the speech signal. An intelligibility measure is output for the at least one frame of the speech signal.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
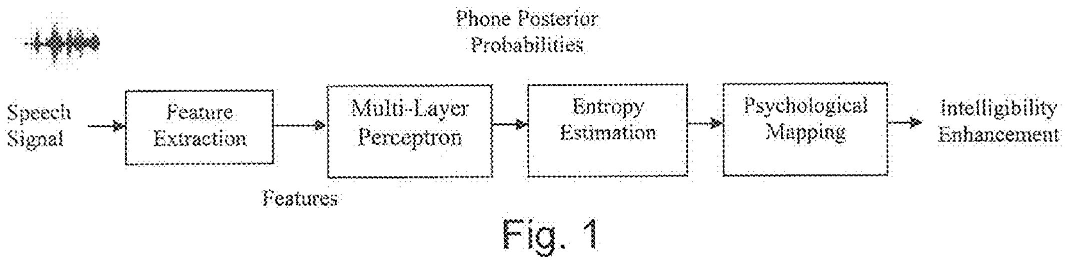
FIG. 1 is a block diagram of the intelligibility assessment system based on phone perception evaluation according to an embodiment of the present invention.

In order to enhance their impact, it is today of first importance to develop blind models that on a signal-based fashion enhance the weight of what could be named the energetic masking of speech by speech. This is obtainable for example by measuring the performances of an artificial speech recognizer with minimal knowledge of language, so as to extract the weight of central cues in message retrieving by humans.

Better understanding of the complex mechanisms of the cocktail party effect at the central level is a key to improve multi-speaker conversation scenarios, the listening of the hearing impaired and the general performances of humans and capacities of attention.

Thus, an aspect of the invention is to provide an improved method and system for assessing intelligibility of speech.

In an embodiment, the present invention provides a new approach for assessing intelligibility of speech based on estimating perception level of phonemes. In this approach, perception scores for phonemes are estimated at each speech frame using a statistical model. The overall intelligibility score for the utterance or conversation is obtained using an average of phoneme perception scores over frames.

According to an embodiment, the invention provides a computer-based method of assessing intelligibility of speech represented by a speech signal, the method comprising the steps of:

a) providing a speech signal;

b) performing a feature extraction on at least one frame of the speech signal to obtain a feature vector for each of the at least one frame of the speech signal;

c) applying the feature vector as input to a statistical machine learning model to obtain as its output an estimated posterior probability of phonemes in the frame for each of the at least one frame, the output being a vector of phoneme posterior probabilities for different phonemes;

d) performing an entropy estimation on the vector of phoneme posterior probabilities of the frame to evaluate intelligibility of the at least one frame; and e) outputting an intelligibility measure for the at least one frame of the speech signal.

The method preferably further comprises after step d) a step of calculating an average measure of the frame-based entropies. A low entropy measure obtained in step d) preferably indicates a high intelligibility of the frame.

According to a preferred embodiment, a plurality of frames of feature vectors are concatenated to increase the dimension of the feature vector.

In an embodiment, the present invention also provides a computer program product, comprising instructions for performing the method according to an embodiment of the invention.

According to another embodiment, the invention provides a speech recognition system for assessing intelligibility of speech represented by a speech signal, comprising:

a processor configured to perform a feature extraction on at least one frame of an input speech signal to obtain a feature vector for each of the at least one frame of the speech signal;

a statistical machine learning model portion receiving the feature vector as input to obtain as its output an estimated posterior probability of phonemes in the frame for each of the at least one frame, the output being a vector of phoneme posterior probabilities for different phonemes;

an entropy estimator for performing entropy estimation on the vector of phoneme posterior probabilities of the frame to evaluate intelligibility of the at least one frame; and an output unit for outputting an intelligibility measure for the at least one frame of the speech signal.

According to an embodiment of the present invention, intelligibility of speech is assessed based on estimating perception level of phonemes. In comparison, conventional intelligibility assessment techniques are based on measuring different signal and noise related parameters from speech/audio.

A phoneme is the smallest unit in a language that is capable of conveying a distinction in meaning. A word is made by connecting a few phonemes based on lexical rules. Therefore, perception of phonemes plays an important role in overall intelligibility of an utterance or conversation. In an embodiment, the present invention assesses intelligibility of an utterance based on average perception level for phonemes in the utterance.

For estimating perception level of phonemes according to an embodiment of the present invention, statistical machine learning models are used. Processing of the speech is done in frame-based manner. A frame is a window of speech signal in which the signal can be assumed stationary (preferably 20-30 ms). The statistical model is trained with acoustic samples (in frame based manner) belonging to different phonemes. Once the model is trained, it can estimate likelihood (probability) of having different phonemes in every frame. The likelihood (probability) of a phoneme in a frame indicates the perception level of the phoneme in the frame. An entropy measure over likelihood scores of phonemes in a frame can indicate the intelligibility of that frame. If the likelihood scores for different phonemes have comparable values, it indicates that there is no clear evidence of a specific phoneme (e.g. due to noise, cross talk, speech rate, etc.), and the entropy measure is higher, indicating lower intelligibility. In contrast, if there is clear evidence of a certain phoneme (high intelligibility), there is a comparable difference between likelihood score of that phoneme and likelihood scores for rest of phonemes resulting in a low entropy measure.

According to various embodiments, the present invention encompasses several alternatives to be used as statistical classifier/model. According to a preferred embodiment, a discriminative model is used. Discriminative models can provide discriminative scores (likelihood, probabilities) for phonemes as discriminative perception level estimates. Another preferred embodiment is using generative models.

Among available discriminative models, it is preferred to use an artificial neural network such as Multi-Layer Perceptrons (MLP) as the statistical model. Having an MLP trained for different phonemes using acoustic data, it can provide posterior probability of different phonemes at the output. Feature extraction in step b) is preferably performed using Mel Frequency Cepstral Coefficients, MFCC. The feature vector for each of the at least one frame obtained in step b) preferably contains a plurality of MFCC-based features and the derivate and second derivate of these features.

The statistical machine learning model is preferably trained with acoustic samples in a frame based manner belonging to different phonemes.

According to an embodiment of the invention, the Speech Intelligibility Index is estimated in a signal based fashion. The SII is a parametric model that is widely used because of its strong correlation with intelligibility. In an embodiment, the present invention provides new metrics based on speech features that show strong correlation with the SII, and therefore that are able to replace the latter. Thus, the perspective of the method is that the intelligibility is be measured on the wave form of the impaired speech signal directly.

Other aspects, features, and advantages will be apparent from the summary above, as well as from the description that follows, including the figures and the claims.

FIG. 1 shows a block diagram of a preferred embodiment of the intelligibility assessment system.

According to an embodiment of the invention, the first processing step is feature extraction. A speech frame generator receives the input speech signal (which maybe a filtered signal), and forms a sequence of frames of successive samples. For example, the frames may each comprise 256 contiguous samples. The feature extraction is preferably done for a sliding window having a frame length of 25 ms, with 30% overlap between the windows. That is, each frame may overlap with the succeeding and preceding frame by 30%, for example. However, the window may have any size from 20 to 30 ms. The invention also encompasses overlaps taken from the range of from 15 to 45%. The extracted features are in the from of Mel Frequency Cepstral Coefficients (MFCC).

The first step to create MFCC features is to divide the speech signal into frames, as described above. This is performed by applying the sliding window. Preferably, a Hamming window is used, which scales down the samples towards the edge of each window. The MFCC generator generates a cepstral feature vector for each frame. In the next step, the Discrete Fourier Transform is performed on each frame. The phase information is then discarded, and only the logarithm of the amplitude spectrum is used. The spectrum is then smoothened and perceptually meaningful frequencies are emphasised. In doing so, spectral components are averaged over Mel-spaced bins. Finally, the Mel-spectral vectors are transformed for example by applying a Discrete Cosine Transform. This usually provides 13 MFCC based features for each frame.

According to an embodiment of the invention, the extracted 13 MFCC based features are used. However, derivate and second derivate of these features are added to the feature vector. This results in a feature vector of 39 dimensions. In order to be able to capture temporal context in the speech signal, 9 frames of feature vectors are concatenated resulting in a final 351 dimensions feature vector.

The feature vector is used as input to a Multi-Layer Perceptron (MLP). Each output of the MLP is associated with one phoneme. The MLP is trained using several samples of acoustic features as input and phonetic labels at the output based on a back-propagation algorithm. After training the MLP, it can estimate posterior probability of phonemes for each speech frame at its output. Once a feature vector is presented at the input of MLP, it estimates posterior probability of phonemes for the frame having the acoustic features at the input. Each output is associated with one phoneme, and provides the posterior probability of respective phoneme.

Figure 2:
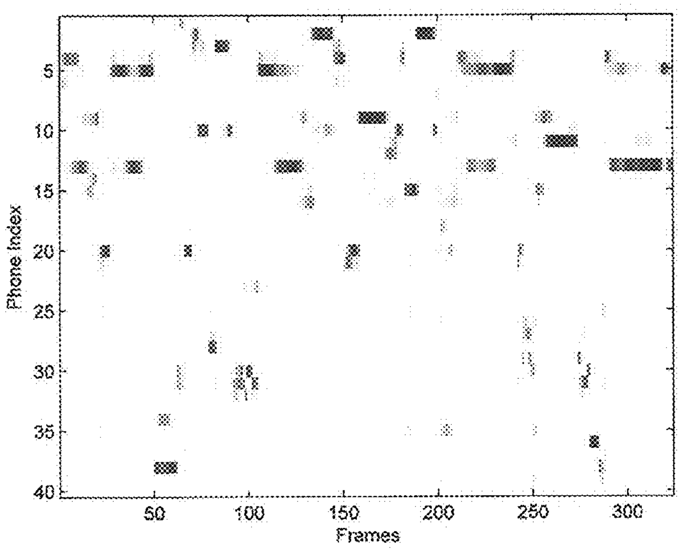
FIG. 2 is an exemplary pattern of phone perception estimates (in terms of posterior probabilities) over frames for clean speech.

FIG. 2 shows a visualized sample of phoneme posterior probability estimates over time. The x-axis is showing time (frames), and the y-axis is showing phoneme indexes. The intensity inside each block is showing the value of posterior probability (darker means larger value), i.e., the perception level estimate for a specific phoneme at specific frame.

The output of the MLP is a vector of phoneme posterior probabilities for different phonemes. A high posterior probability for a phoneme indicates that there is evidence in acoustic features related to that phoneme.

Figure 3:
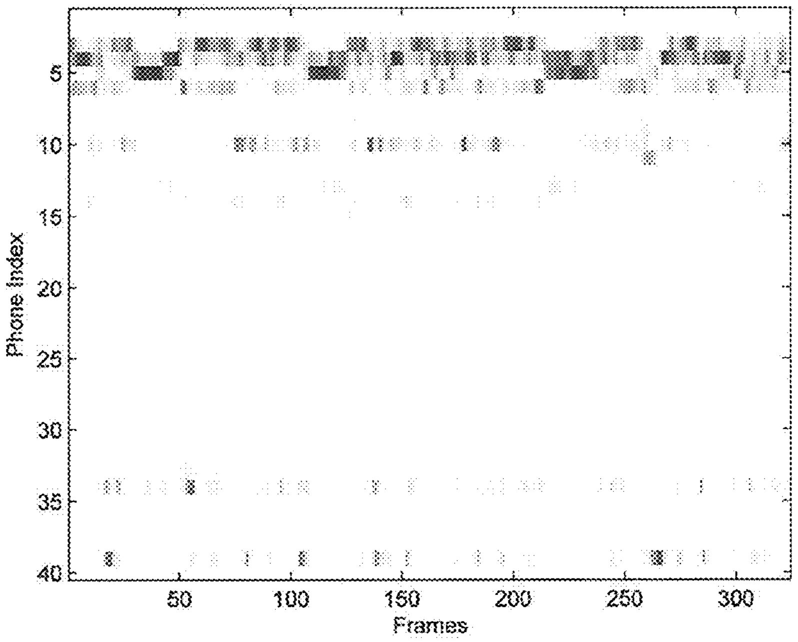
FIG. 3 is an exemplary pattern of phone perception estimates (in terms of posterior probabilities) over frames for noisy speech.

In the next step, the entropy measure of this phoneme posterior probability vector is used to evaluate intelligibility of the frame. If the acoustic data is low in intelligibility due to e.g. noise, cross talks, speech rate, etc., the output of the MLP (phoneme posterior probabilities) tends to have closer values. In contrast, if the input speech is highly intelligible, the MLP output (phoneme posterior probabilities) tend to have a binary pattern. This means that only one phoneme class gets a high posterior probability and the rest of phonemes get a posterior close to 0. This results in a low entropy measure for that frame. FIG. 2 shows a sample of phoneme posterior estimates over time for highly intelligible speech, and FIG. 3 shows the same case for low intelligible speech. Again, the y-axis shows phone index and the x-axis shows frames. The intensity inside each block shows perception level estimate for a specific phoneme at specific frame.

Preferably, an average measure of the frame-based entropies is used as indication of intelligibility over an utterance or a recording. The intelligibility is determined based on reverse relation with average entropy score.

As discussed above, conventional techniques for intelligibility assessment concentrate mainly on the long term averaged features of speech. Therefore, they are not able to assess reduction of intelligibility in situations such as cross talks. In case of a cross talk, the intelligibility reduces, although the signal to noise ratio does not significantly changes. This means that the regular intelligibility techniques fail to assess the reduction of intelligibility is a case of cross talks. Similar examples can be made for cases of low intelligibility due to speech rate (speaking very fast), highly accented speech, etc. In contrast, according to the invention, the intelligibility is assessed based on estimating perception level of phonemes. Therefore, any factor (e.g. noise, cross talk, speech rate) which can affect perception of phonemes can affect the assessment of intelligibility. Compared to traditional techniques for intelligibility assessment, the method of the invention provides the possibility to additionally take into account effect of cross talks, speech rate, accent and dialect in intelligibility assessment.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

What is claimed is:

1. A method for assessing intelligibility of speech represented by a speech signal, the method comprising:

receiving a speech signal;

performing a feature extraction on a frame of the speech signal so as to obtain a feature vector for each of the frame of the speech signal, wherein the feature extraction comprises:

performing a Discrete Fourier Transform on the frame;

discarding phase information of the frame;

smoothing an amplitude spectrum of the frame so as to emphasize perceptually meaningful frequencies; and transforming spectral vectors by applying a Discrete Cosine Transform;

and wherein the feature vector comprises a plurality of Mel Frequency Cepstral Coefficients (MFCC)-based features, derivates of the plurality of MFCC-based features, and second derivates of the plurality of MFCC-based features;

concatenating the feature vector with a plurality of feature vectors from temporally adjacent frames of the speech signal so as to form a concatenated feature vector;

inputting the concatenated feature vector to a Multi-Layer Perceptron (MLP) and obtaining from the MLP a vector of phoneme posterior probabilities of different phonemes for the frame of the speech signal;

performing an entropy estimation on the vector of phoneme posterior probabilities of so as to evaluate intelligibility of the frame of the speech signal; and outputting an intelligibility measure for the speech signal based on averaging the entropy estimation of the frame of the speech signal with entropy estimations of other frames of the speech signal.

2. The method according to claim 1, wherein a low entropy measure obtained in the entropy estimation indicates a high intelligibility of the at least one frame of the speech signal.

3. The method according to claim 1, wherein the MLP is trained with acoustic samples based on frames belonging to different phonemes.

4. A non-transitory, computer-readable medium having computer-executable instructions for assessing intelligibility of speech represented by a speech signal, the computer-executable instructions, when executed by the processing unit, causing the following steps to be performed:

performing a feature extraction on a frame of the speech signal so as to obtain a feature vector for each of the frame of the speech signal, wherein the feature extraction comprises:

performing a Discrete Fourier Transform on the frame;

discarding phase information of the frame;

smoothing an amplitude spectrum of the frame so as to emphasize perceptually meaningful frequencies; and transforming spectral vectors by applying a Discrete Cosine Transform;

and wherein the feature vector comprises a plurality of Mel Frequency Cepstral Coefficients (MFCC)-based features, derivates of the plurality of MFCC-based features, and second derivates of the plurality of MFCC-based features;

concatenating the feature vector with a plurality of feature vectors from temporally adjacent frames of the speech signal so as to form a concatenated feature vector;

inputting the concatenated feature vector to a Multi-Layer Perceptron (MLP) and obtaining from the MLP a vector of phoneme posterior probabilities of different phonemes for the frame of the speech signal;

performing an entropy estimation on the vector of phoneme posterior probabilities so as to evaluate intelligibility of the frame of the speech signal; and outputting an intelligibility measure for the speech signal based on averaging the entropy estimation of the frame of the speech signal with entropy estimations of other frames of the speech signal.

5. A speech recognition system for assessing intelligibility of speech represented by a speech signal, the system comprising:

a processor configured to perform a feature extraction on a frame of an input speech signal so as to obtain a feature vector for each of the frame of the speech signal, wherein the feature extraction comprises:

performing a Discrete Fourier Transform on the frame;

discarding phase information of the at frame;

smoothing an amplitude spectrum of the frame so as to emphasize perceptually meaningful frequencies; and transforming spectral vectors by applying a Discrete Cosine Transform;

and wherein the feature vector comprises a plurality of Mel Frequency Cepstral Coefficients (MFCC)-based features, derivates of the plurality of MFCC-based features, and second derivates of the plurality of MFCC-based features; and wherein the processor is further configured to concatenate the feature vector with plurality of feature vectors from temporally adjacent frames of the speech signal so as to form a concatenated feature vector;

a statistical machine learning model portion configured to receive the concatenated feature vector as an input into a Multi-Layer Perceptron (MLP) and obtain from the MLP a vector of phoneme posterior probabilities for different phonemes for the frame of the speech signal;

an entropy estimator configured to perform an entropy estimation on the vector of phoneme posterior probabilities so as to evaluate intelligibility of the frame of the speech signal; and an output unit configured to provide an intelligibility measure for the speech signal based on averaging the entropy estimation of the frame of the speech signal with entropy estimations of other frames of the speech signal.

* * * * *